United States Patent
Wild

Patent Number: 6,160,442
Date of Patent: Dec. 12, 2000

[54] LOAD-SIDE FILTER ARRANGEMENT FOR A CONVERTER CIRCUIT ARRANGEMENT

[75] Inventor: Gerhard Wild, Regensburg, Germany

[73] Assignee: Asea Brown Boveri AG, Baden, Switzerland

[21] Appl. No.: 09/280,986

[22] Filed: Mar. 30, 1999

[30] Foreign Application Priority Data

Mar. 30, 1998 [CH] Switzerland .................. 198 14 059.2

[51] Int. Cl.$^7$ ...................................................... H02M 1/14

[52] U.S. Cl. ........................... 327/551; 327/558; 363/45; 363/47

[58] Field of Search .................................. 327/551, 557, 327/558, 559, 310, 311; 363/39, 40, 45, 47, 173

[56] References Cited

U.S. PATENT DOCUMENTS

| | | | |
|---|---|---|---|
| 3,290,578 | 12/1966 | Ainsworth | 363/39 |
| 3,501,686 | 8/1968 | Tveteras et al. | 363/39 |
| 3,883,792 | 5/1975 | Ellert | 363/39 |
| 4,623,830 | 12/1966 | Peneder et al. | 363/39 |

FOREIGN PATENT DOCUMENTS

| | | |
|---|---|---|
| 0318790A1 | 6/1989 | European Pat. Off. . |
| 0682401A1 | 11/1995 | European Pat. Off. . |
| 0682402A1 | 11/1995 | European Pat. Off. . |

*Primary Examiner*—Tuan T. Lam
*Attorney, Agent, or Firm*—Burns, Doane, Swecker & Mathis, L.L.P.

[57] ABSTRACT

In a load-side filter of an n-phase converter circuit arrangement, the capacitors are arranged in at least two n-phase capacitor groups, one of which is hard-grounded and the other of which is grounded with a high impedance via a grounding resistor.

2 Claims, 1 Drawing Sheet

LOAD-SIDE FILTER ARRANGEMENT FOR A CONVERTER CIRCUIT ARRANGEMENT

BACKGROUND OF THE INVENTION

1. Field of the invention

The invention relates to the field of power electronics. It is based on a filter arrangement which is connected to the load side of a converter circuit arrangement, in which case the converter circuit arrangement has n phases and comprises n load connections to which the filter arrangement is connected, which filter arrangement comprises at least one series inductance per load connection. A filter arrangement of this generic type has already been described in European Patent Applications EP 0 682 401 A1 and EP 0 682 402 A2.

2. Discussion of Background

In the documents mentioned above, an LC low-pass filter which is possibly lossy due to resistances is inserted between the load connections and a load. The connections of the capacitors can either be joined together to form a star point, or can be connected to the positive and negative connections of the intermediate circuit. The circuit arrangement described in these documents are preferably used for low-voltage applications. EP 0 318 790 also discloses a high-pass filter for a filter arrangement for a cable which is connected to converters.

The aim of a load-side filter is to achieve an output voltage which is as sinusoidal as possible. One ay would be to design the filter to be as large as possible. However, this would have a number of important disadvantages. If the filter capacitor were short-circuited, the relevant capacitor, and all the others connected in parallel, would be discharged through the short-circuit. Furthermore, the short-circuit can result in large sudden torque changes on the connected motor, and high overvoltages on the motor windings and filter capacitors. As consequential faults, other short circuits can occur, so that a large amount of energy is suddenly released, which can result in destruction. The greater the filter capacitance is chosen to be, the greater is the amount of energy which must be destroyed in a deflective filter can. In consequence, the filter can can burst, and isolation oil can escape and contaminate the environment.

SUMMARY OF THE INVENTION

Accordingly, one object of the invention is to provide a novel filter arrangement for a converter circuit arrangement, in which filter arrangement the destructive consequences of a capacitor short circuit can be limited to a minimum, or can be entirely avoided.

This object is achieved by a filter arrangement which is connected to the load side of a converter circuit arrangement, in which case the converter circuit arrangement has n phases and comprises n load connections to which the filter arrangement is connected, which filter arrangement comprises at least one series inductance per load connection, wherein the filter arrangement comprises at least two n-phase capacitor groups in which in each case at least one capacitor is arranged per load connection; wherein the capacitors in one capacitor group are connected in star, and the star point of one capacitor group is grounded via a grounded resistor, and the star point of the other capacitor group is hard-grounded.

The essence of the invention is thus that the capacitors of the load-side filter are combined in at least two n-phase capacitor groups, one capacitor group is hard-grounded, and the other capacitor group is grounded with a high impedance via a grounded resistor. In the event of a short circuit in a filter capacitance only the capacitance of the defective capacitor group is thus lost. The other capacitors continue to see the normal phase voltage and are thus not discharged as long as $1/\omega \cdot C_f \ll R_e$ holds ($C_f$=filter capacitance, $R_e$=grounding resistance). Furthermore, no overvoltages occur after the capacitor short circuit, and the motor or the load do not experience any overvoltages, either. In principle, it is possible for the system to continue to operate after the short circuit. The same is true for a single-phase motor ground fault. In the event of a ground fault or a terminal short circuit on the motor side, the short-circuit current is limited, and no common-mode voltages are produced on the motor. Standard resistors may be used as the grounding resistor. Even in the case of a number of parallel-connected capacitor groups, only one grounding resistor is required, depending on the energy content of the capacitor groups. The capacitor groups are preferably each surrounded by a filter can.

BRIEF DESCRIPTION OF THE DRAWING

A more complete appreciation of the invention and many of the intended advantages thereof will be readily obtained as the same becomes better understood by reference to the following detailed description when considered in connection with the accompanying drawing, wherein.

Figure 1:
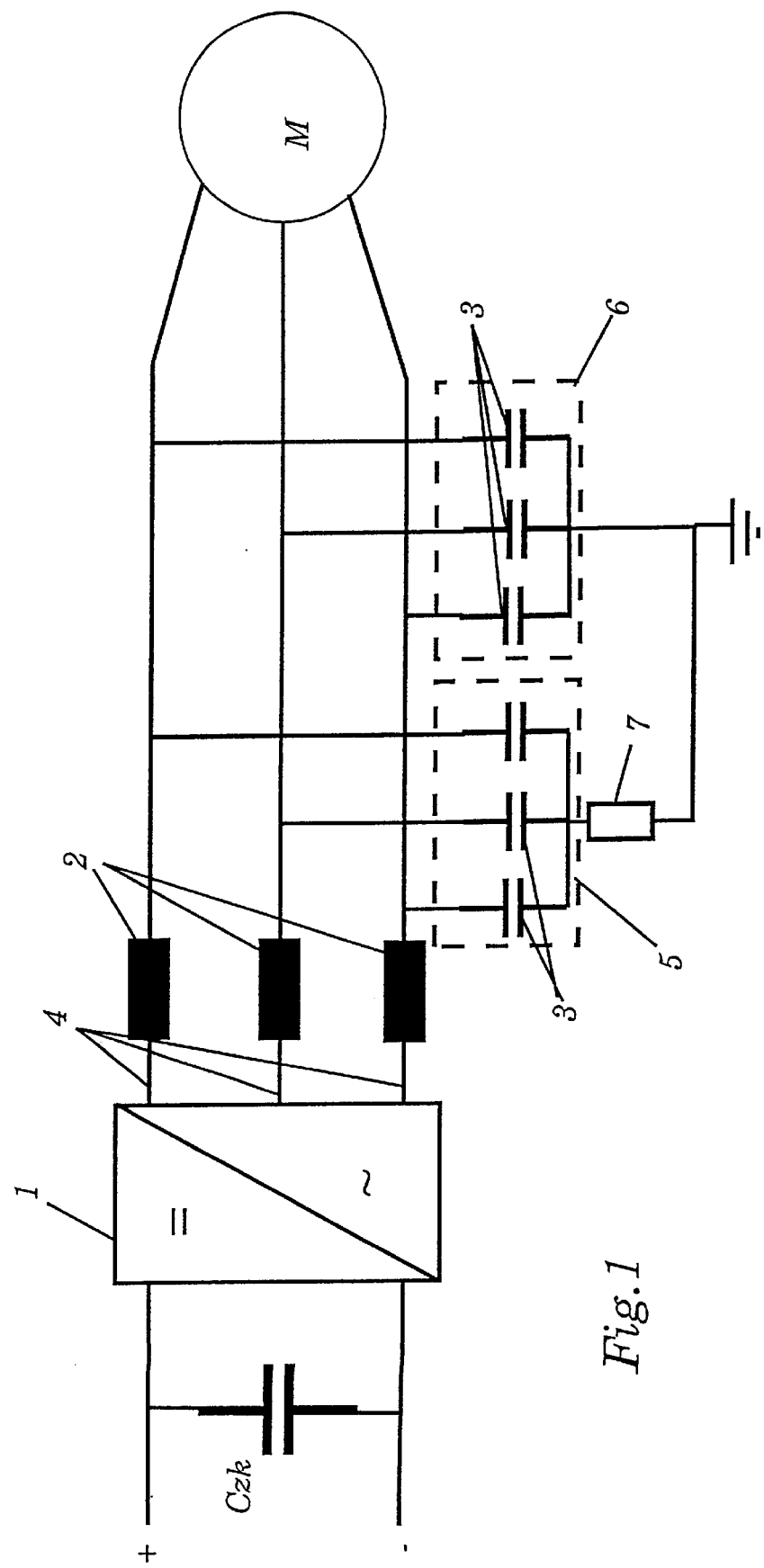
FIG. 1 shows an exemplary embodiment of the circuit design according to the invention.

The reference numerals used in the drawing and their meanings are listed in summarized form in the list of designations.

DESCRIPTION OF THE PREFERRED EMBODIMENT

Referring now to the drawings, wherein like reference numerals designate identical or corresponding parts throughout the several views, FIG. 1 shows an exemplary embodiment of the invention. 1 denotes a power-electronic circuit arrangement, in particular an inverter, which is fed from DC intermediate circuit, represented by the intermediate circuit capacitor Czk and the positive and negative poles +/−. The inverter 1 converts the DC voltage into an AC voltage of variable amplitude and frequency. This AC voltage supplies a load, for example a motor M. In order to achieve output parameters that are as sinusoidal as possible, a load-side filter is provided, and is connected between the load connections 4 of the inverter 1 and the load M. The filter is essentially formed by an LC element with one series inductance 2 and one capacitor 3 per phase. According to the invention, two capacitors 3 are now provided per phase, each of which is assigned to one of the two capacitor groups 5 and 6. Thus, in general, at least two n-phase capacitor groups are formed for an n-phase circuit. The two capacitor groups 5 and 6 in consequence each comprise three capacitors which, for example, are kept immersed in oil and are preferably surrounded by a can. The capacitors 3 in one capacitor group are in each group connected in star. The essence of the invention is now for the capacitors in one capacitor group to be hard-grounded, that is to say without any interposition of a grounding resistor, and for those in the other capacitor group to be grounded through a high impedance via a grounding resistor 7.

Obviously, numerous modifications and variations of the present invention are possible in light of the above teachings. It is therefore to be understood that, within the scope of the appended claims, the invention may be practiced otherwise than as specifically described herein.

What is claimed is:

1. A filter arrangement which is connected to a load side of a converter circuit arrangement, wherein the converter circuit arrangement has n phases and comprises n load connections to which the filter arrangement is connected, the filter arrangement comprising:

for each load connection, at least one inductance connected in series between the converter circuit arrangement and the load connection;

at least two n-phase capacitor groups, each group including, for each of then load connections at least one capacitor connected to the respective load connection;

wherein the capacitors in a first one of the at least two N-phase capacitor groups are connected to form a first one of the N-phase star, and the star point of the first capacitor groups is grounded via a grounded resistor, and the capacitors in a second one of the at least two N-phase capacitor groups are connected to form a second star, and the star point of the second N-phase capacitor groups is hard-grounded.

2. The filter arrangement as claimed in claim 1, wherein the capacitors in one of the capacitor groups are each enclosed by a can.

* * * * *